Nov. 12, 1929.  O. MELAUN  1,735,776
METHOD OF PRODUCING CLAMPING PLATES
Filed July 19, 1926   3 Sheets-Sheet 1

Inventor
Oscar Melaun
By
Attorney.

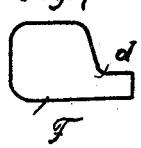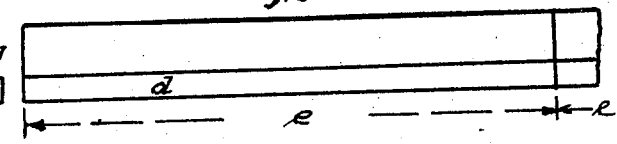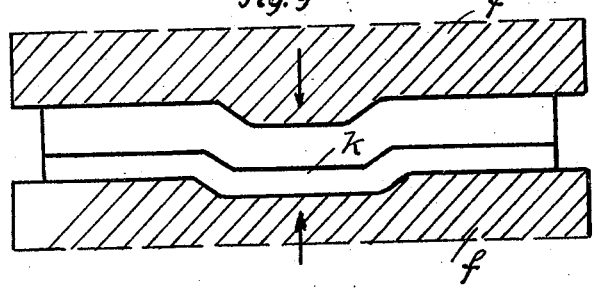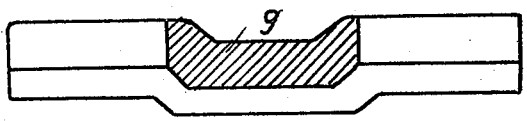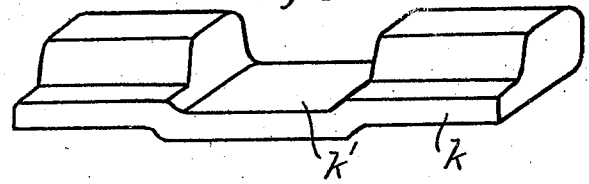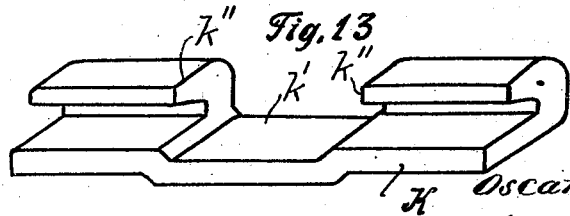

Nov. 12, 1929.    O. MELAUN    1,735,776
METHOD OF PRODUCING CLAMPING PLATES
Filed July 19, 1926    3 Sheets-Sheet 3
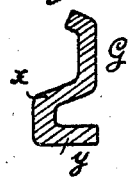
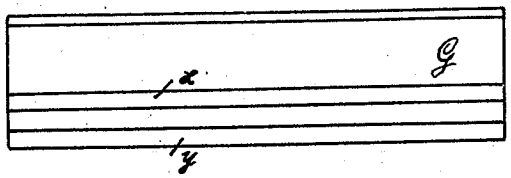
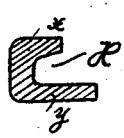
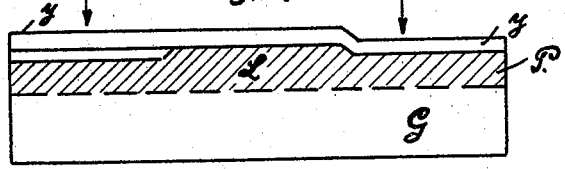
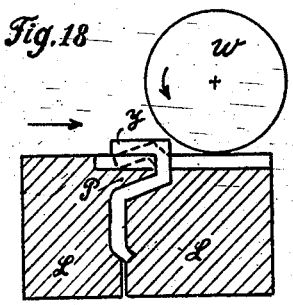
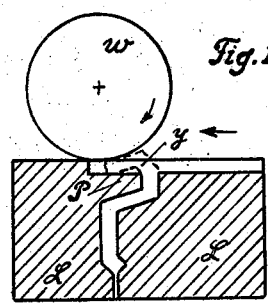
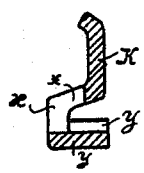
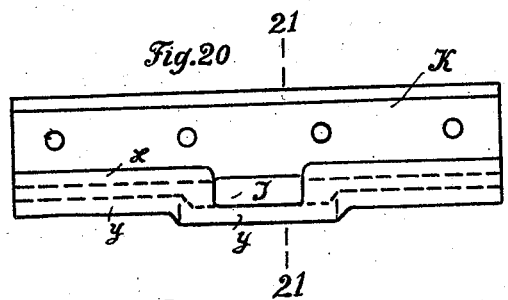
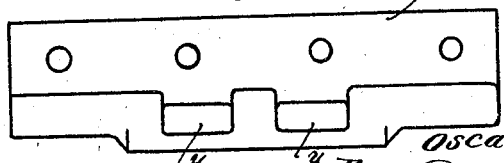
Inventor
Oscar Melaun Patented Nov. 12, 1929

1,735,776

UNITED STATES PATENT OFFICE

OSCAR MELAUN, OF LANKE, NEAR BERLIN, GERMANY

METHOD OF PRODUCING CLAMPING PLATES

Application filed July 19, 1926, Serial No. 123,473, and in Germany July 22, 1925.

The present invention relates to improvements in a method for producing fish-plates.

In order to fully illustrate, there are three methods shown in the present application and illustrated in the drawings, in which:—

Figures 7 and 8 are, respectively, end and side views of another shaped blank from which the present fish-plate can be made;

Figure 9 shows a method of forming the transverse depression therein;

Figure 10 is a view illustrating in dark sectional lines the portion to be cut from the blank;

Figure 11 shows the blank thus formed in perspective;

Figure 12 is an end view showing in section the portion to be cut out to form the base-receiving clamp;

Figure 13 is a perspective view of the finished fish-plate;

Figure 14 is an interior view of the roll bar;

Figure 15 is an end view thereof;

Figure 16 is an end view of another form from which the fish-plate can be produced;

Figure 17 is an internal view of the plate, as shown in Figure 14 in its mold;

Figure 18 illustrates the first step in the rolling process of the bar shown in Figures 14 and 15;

Figure 19 illustrates the final rolling operation;

Figure 20 is a top plan view of the complete fish-plate made from the bar shown in Figure 14;

Figure 21 is a section taken on line 21—21 of Figure 20; and

Figure 22 is a top plan view of a modified form of fish-plate.

Figure 1:
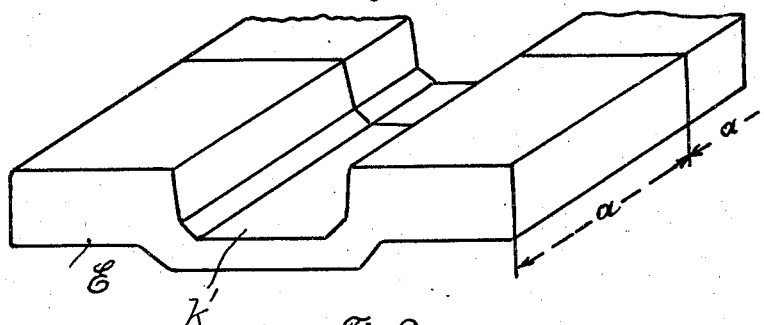
Figure 1 is a perspective view of a double blank just previous to its being cut into lengths.
Figure 2:
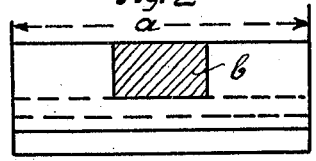
Figure 2 is a view illustrating the first step in making the first cut.
Figure 3:
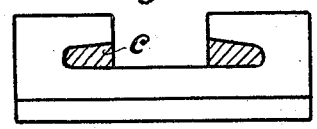
Figure 3 is a view illustrating the next step and forming the longitudinal recess.
Figure 4:
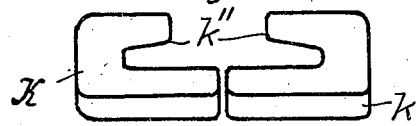
Figure 4 shows the next step in separating the blank into two fish-plates.
Figure 5:
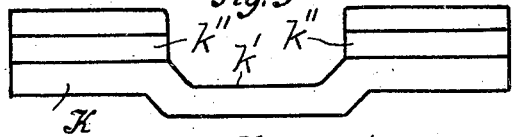
Figure 5 is a front view of the completed fish-plate.
Figure 6:
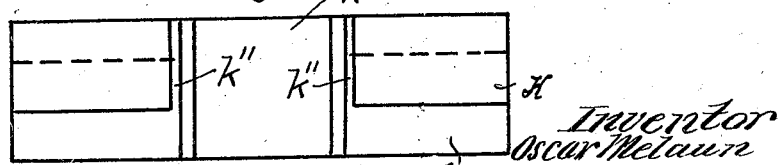
Figure 6 is a top plan view thereof.

Method No. 1: The first method of making the fish-plate K consisting primarily of the base $k$, the transverse depression $k'$, and the two slotted projections or rail web-receiving clamps $k''$, is shown in Figures 1 through 6. In this case, the blank E is cut in lengths $a$. The blank is then cut longitudinally to remove the section $b$, as in Figures 2 and 3, and the parts $c$ are removed. As shown in Figure 4, the blank is separated longitudinally to form the two completed fish-plates K.

Method No. 2: As shown in Figures 8 to 13, the fish-plate is formed from the blank F, having the reduced edge or flange $d$. The transverse depression is formed by a press or hammer, as shown in Figure 9, and then the slug $g$ is cut therefrom, as shown in Figures 10 and 11. The cut $h$ is now removed and the fish-plate K, as shown in Figure 13, results.

Method No. 3: As shown in Figures 14, 15, 17, 18, 19 and 20, the fish-plate K, as shown in Figures 21 and 22 is formed.

The bar G in Figures 14 and 15 is rolled in the shape with the flange $x$ and the edge $y$ defining the wide clamping groove. This rolled article is placed in the clamp L with the edge $y$ above the upper face of the bed. The roll $w$ moving from the position of Figure 18 to that of Figure 19 compresses the flange or edge $y$ over the projecting portion P of the mold and thus gives it a better clamping action to fit closely upon the base web of a rail or girder.

The cut-away portion or opening J is then produced by milling or otherwise, and thus serves for the reception of a wedge plate (not shown).

As shown in Figure 22, two openings J instead of one for two wedge plates are provided.

The bar H, as shown in Figure 16, is also used as a basis for making the fish-plate K, but more particularly to produce the clamping edge or flange $k''$.

From the foregoing description, it will be seen that although three methods of making the fish-plate are illustrated, the main steps in each are identical, and that by these methods substantially the same fish-plate K results.

I claim:

1. A method of producing clamping plates for girder constructions and the like, consisting in forming a groove in the middle part of a metallic blank, depressing this part over a certain width and depth, and forming lateral length slots in the end parts of said blank.

2. A method of producing clamping-plates for girder constructions and the like, consisting in forming a groove in the middle part of a rod-shaped metallic blank, depressing this part over a certain width and depth, and forming lateral length slots in the end parts of said rod-shaped blank.

3. A method of producing clamping plates for girder constructions and the like, consisting in forming a groove in the middle part of a metallic blank of double breadth, depressing this part over a certain width and depth, forming two lateral length slots in the end parts of said blank of double breadth, and finally cutting said blank of double breadth in the middle.

In testimony whereof I have hereunto set my hand.

OSCAR MELAUN.